Oct. 6, 1964    M. BASCHE    3,152,006
BORON NITRIDE COATING AND A PROCESS OF PRODUCING THE SAME
Filed June 29, 1961
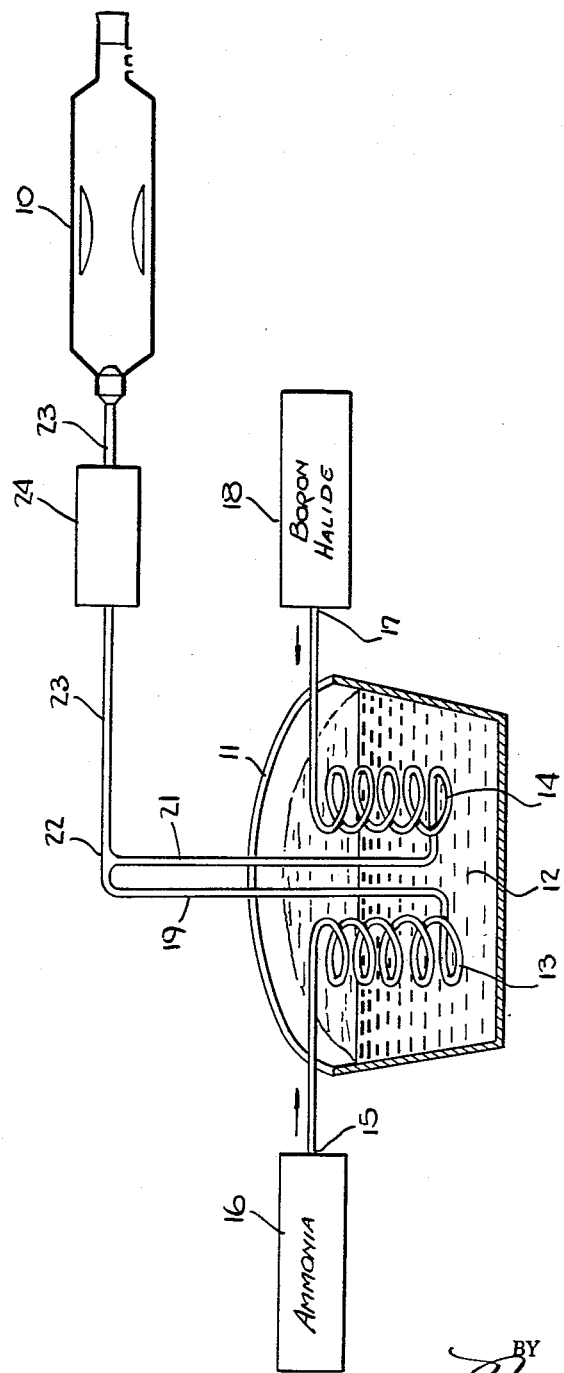
INVENTOR.
MALCOLM BASCHE
BY
ATTORNEY 3,152,006
BORON NITRIDE COATING AND A PROCESS OF PRODUCING THE SAME
Malcolm Basche, Newton, Mass., assignor to High Temperature Materials, Inc., Boston, Mass., a corporation of Delaware
Filed June 29, 1961, Ser. No. 120,589
8 Claims. (Cl. 117—106)

This invention relates to a boron nitride coating and, particularly, to a new and improved process of depositing boron nitride onto a suitable substrate such as a heat-shield.

It is often necessary to adapt delicate instruments or explosive materials with a suitable cover or shield which will insulate them against large changes in temperature. A number of these shields are coated in order to increase their insulating properties. A coating, which is quite effective when used for this purpose, is boron nitride. This is because this material exhibits excellent insulating properties.

Heretofore, however, the use of boron nitride was curtailed because it was produced as a powder by the vaporous interaction of nitrogen, hydrogen, and boron trichloride. This prior process, however, lacks commercial utility because it is inefficient. There is only a small percentage of boron nitride produced per input of material. The process is also very difficult to run because an electric arc discharge is required in order to provide the atmosphere necessary for the reactants to effectively produce the nitride of boron. The basic reason for this atmospheric requirement lies in the fact that gaseous nitrogen will not readily react with hydrogen and boron trichloride. In any case, the powdery product of this reaction must be pressed into shape at elevated temperatures and this alone necessitates inconvenience, delay and expense. It has also been found that articles produced in this manner are porous and lack the strength desired for an effective heat-shield.

An object of the present invention is to provide a new and improved process wherein boron nitride is produced in a form which may be conveniently and easily used as an improved heat-shield.

Another object of this invention is to provide a new and improved process of plating wherein a suitable substrate may be easily and conveniently coated with a new form of boron nitride.

Many other advantages and objects will become more apparent to those skilled in the art upon a reading of the following specification and claims.

We have now discovered that boron nitride may be advantageously produced by a vapor-phase reaction between ammonia and boron trichloride. The advantage of this process is that ammonia will decompose to atomic nitrogen (N) and hydrogen which, in turn, will react quite easily with boron trichloride to produce boron nitride. The difference between this process and the prior art, heretofore described, lies in the fact that ordinary nitrogen gas ($N_2$), which itself is difficult to react with boron trichloride, will not readily decompose to atomic or nascent nitrogen under ordinary conditions. The process of the present invention is also highly efficient and the overall reaction may be summarized as follows:

$$NH_3 + BCl_3 \rightarrow BN + 3HCl$$

As shown, the amount of material produced is directly proportional to the amount of each of the reactants utilized in the process, i.e., 1 mole of boron nitride is produced for every mole of ammonia that is reacted with one mole of boron trichloride.

We have also discovered that this process may be used to directly coat a suitable substrate such as a heat-shield if the substrate is contacted with the reacted vapors of the described reactants. This is important because the final coating, which is comparatively non-porous, exhibits a very high strength at elevated temperatures. It has also been found that a coating produced by this process has a destructive temperature as high as 2700° C. to 3000° C. and is highly corrosive resistant. All these advantages render a coating produced by this process quite readily adaptable for such things as heat-shields or heat insulating covers.

Broadly, the process of this invention also comprises reacting ammonia and a boron halide together at elevated temperatures to produce boron nitride.

The process of this invention also comprises contacting a suitable substrate with the comingled vapors of ammonia and a boron halide, such as boron trichloride, at a temperature between about 1450° C. and 2300° C. thereby producing boron nitride on the surface of such substrate.

This process utilizes a vapor-phase technique in which boron nitride is deposited onto a surface by the thermal decomposition and reaction of ammonia with a boron halide such as boron trichloride. This technique is described in detail as follows:

The figure of the drawing is a front view of the apparatus including the reactor and heating unit utilized in the process described herein.

The substance desired to be coated is mounted in reactor 10 which is of the type general utilized in vapor depositions. The temperature of the reactor is then increased from room temperature to between about 1450° C. and 2300° C. This reactor 10 is directly connected to a heating unit 11 as shown in FIG. 1. The heating unit is then charged with gaseous ammonia and boron trichloride.

The heating unit set forth in FIG. 1 consists essentially of an oil bath 12 having immersed therein two separate coiled circuits of tubing 13 and 14. The inlet passage 15 of coiled tubing circuit 13 is attached to a supply of gaseous ammonia 16 maintained under a suitable pressure, while inlet passage 17 of coiled tubing circuit 14 is attached to a supply of a gaseous boron halide, such as boron trichloride, maintained under a suitable pressure. The body portion of each of the tubing circuits 13 and 14 extends downwardly into the oil bath in the form of a plurality of circular coils. The depth to which each of the tubing circuits extends and the number of coils required are each dependent upon the temperature desired to be imparted to the individual reactants passing through their respective circuits. The exhaust portions 19 and 21 of each of the tubing circuits extend in an upwardly direction and are joined together at junction 22 which is in proximity to the bath. Junction 22 extends into feed line 23 having a filter 24 which is adapted to remove the solid impurities from the system. Line 23 directly feeds into reactor 10. This type of tubing circuit insures that the two gases are well mixed before entering the reactor and that a correct balance of reactants can be controlled at all times.

When the temperatures of the system are established, the comingled gaseous reactants are then introduced into the reactor 10. After a suitable time, i.e., when a coating of a desired thickness is obtained, the gaseous reactants are shut off and the temperature of the system is allowed to return to room temperature. At this point, the substrate having a coating of boron nitride, is ready to be utilized.

The overall decomposition rate of the coating process, heretofore described in detail, is dependent upon the individual amount of each of the reactants introduced into the reactor. A deposition rate of maximum utility is about 15 mils per hour.

It has been found that the process is operative when the ratio of the materials utilized, i.e., ammonia to boron halide, lies in the range between 4 moles to 1 mole and 1 mole of ammonia to 1 mole of boron halide. However, the process is quite effective when the ratio of ammonia to boron halide utilized in the system lies in the preferred range of between about 2 moles to 1 mole and about 1 mole to 1 mole. The basic reason for this preference is that, in many cases, it is desired to maintain a slight nitrogen pressure in the system since boron nitride is more stable in a nitrogen atmosphere.

The flow rates of the reactants are intimately connected with the specific design of the reactor. The only influence that the flow rate of the reactants will have on the process is to bring more or less material into the reaction vessel. The shape and size of the surface to be coated and the desired thickness of the deposit are all factors which determine the rate of flow of the individual reactants. The basic requirement of the flow is that it should be at a rate that will insure that the gases are well mixed before they reach the deposition zone of the reactor. Also, an inert gas having a flow rate of 3 to 4 times that of the ammonia gas may be introduced into the ammonia stream. This will increase the velocity of flow of the gaseous ammonia and will help promote mixing and the general flow of the combined gases across the substrate surface.

Each of the reactants should be maintained at a temperature between 100° C. and 300° C. prior to entering the reactor. This is the reason that the individual reactants are passed through a heating unit as heretofore described in detail. It has been found that a large amount of white material will form before the reactants enter the heated reactor if they are not maintained between the temperature range set forth above. This white material, which represents impurities of an intermediate nature, prevents a homogeneous product from forming during processing. It can be seen therefore that the reactants should be maintained between 100° C. and 300° C.

The reactor should be maintained at a temperature which will facilitate the decomposition and reaction of the ammonia gas with a gaseous boron halide. The present process has been found to be operative when the reactor is maintained at a temperature between about 1450° C. and 2300° C. If the reactor is heated to a temperature below 1450° C., the final product will be glassy and unstable, i.e., it will be readily soluble in water. It will also have a low density of about 1.45 grams/cm.$^3$ and will decompose when heated in air. However, if the reactor is heated above 2300° C., the final product may sublime or decompose as fast as it is produced. In many cases, under such circumstances, the product may react with the substrate itself even if the substrate is an inert material such as graphite. The process, however, is very efficient if the temperature of the reactor is maintained between a preferential temperature range of 1850° C. and 2200° C. and especially at about 2000° C. Boron nitride produced within the latter range has a density between about 1.99 and 2.20 grams/cm.$^3$ and is quite stable in water.

The pressure of the process is interrelated to temperature. The process is operative at a pressure up to 50 mm. of mercury. If the pressure is maintained above 50 mm. a large amount of white powder will form again indicating that impurities have been produced in the system. Materials have been coated when the pressure of the process was maintained at 5 mm. of mercury with only a slight amount of white powder being formed during processing. However, the deposition rate at this pressure is quite low and the resulting coating is thin. A very excellent coating and a high yield is obtained, however, if the pressure is maintained at about 1 mm. of mercury. In any case, as heretofore stated, the process is operative at a pressure up to 50 mm. of mercury.

The following example will illustrate the process.

EXAMPLE I

A reactor of the type heretofore described was subjected to a pressure of about 1 mm. of mercury. The temperature of the reactor was then raised to 1850° C. at which time the individual gaseous reactants were introduced into the heating unit. The ratio of gaseous ammonia to boron trichloride was about 1 mole to 1 mole. The heating unit increased the temperature of the individual reactants to between 150° C. and 200° C. at which time they were uniformly mixed and injected into the reactor as heretofore described. After a suitable time, the gases were turned off and the reactor was allowed to return to room temperature. The coating of boron nitrate was then tested and found to have the properties given below in Table I.

*Table I*

| | | |
|---|---|---|
| Density | gms./cm.$^3$ | 1.99 |
| Bending strength | p.s.i. | 26,200 |
| Shear strength | p.s.i. | 900–1400 |
| Young's modulus | | $4.0 \times 10^6$ |
| Thermal conductivity, kc., at— | | |
| 250° F. | B.t.u. per ft./hr. | 1.29 |
| 500° F. | | 0.90 |
| 700° F. | | 0.87 |
| 900° F. | | 0.85 |

Numerous experiments utilizing a wide range of process conditions were carried out in the manner set forth in Example I. In these experiments, ratios of ammonia to boron trichloride from about 1 to 2 to about 4 to 1, temperatures from about 1450° C. to about 2300° C. and pressures from about less than 1 mm. of mercury to about 50 mm. of mercury were employed. In each experiment a coating similar to that produced in Example I was obtained.

As various changes may be made in the form, construction and arrangement of the parts herein without departing from the spirit and scope of the invention and without sacrificing any of its advantages, it is to be understood that all matter herein is to be interpreted as illustrative and not in a limited sense.

I claim:

1. The process of producing boron nitride which comprises interreacting vapors of ammonia and a gaseous boron halide within the temperature range of between 1450° C. and 2300° C., and at a pressure below about 50 mm. of mercury.

2. The process of producing boron nitride which comprises interreacting vapors of ammonia and boron trichloride within the temperature range of between 1450° C. and 2300° C. and at a pressure below about 50 mm. of mercury.

3. The process of coating a subtrate with boron nitride which comprises contacting said substrate with the comingled vapors of ammonia and a gaseous boron halide within the temperature range of between 1450° C. and 2300° C. and at a pressure below about 50 mm. of mercury.

4. The process of coating a subtrate with boron nitride which comprises contacting said substrate with the comingled vapors of ammonia and boron trichloride within the temperature range of between 1450° C. and 2300° C. and at a pressure below about 50 mm. of mercury.

5. Boron nitride produced by the interreaction of ammonia vapors and a gaseous boron halide within the temperature range of between 1450° C. and 2300° C. and at a pressure below about 50 mm. of mercury.

6. Boron nitride produced by the interreaction of ammonia vapors and boron trichloride within the temperature range of between 1450° C. and 2300° C. and at a pressure below about 50 mm. of mercury.

7. An article comprising a substrate having thereon a boron nitride coating produced by contacting said substrate with the comingled vapors of ammonia and a boron halide within the temperature range of between about 1450° C. and about 2300° C. and at a pressure below about 50 mm. of mercury.

8. An article comprising a substrate having thereon a boron nitride coating produced by contacting said substrate with the comingled vapors of ammonia and boron trichloride within the temperature range of between about 1450° C. and about 2300° C. and at a pressure below about 50 mm. of mercury.

References Cited in the file of this patent

UNITED STATES PATENTS 2,865,715    Kamlet _____ Dec. 23, 1958
2,938,816    Gunther _____ May 21, 1960